Dec. 18, 1928.

A. L. FELDE 1,695,371

SCREEN

Filed March 31, 1927    2 Sheets-Sheet 1

Inventor

A. L. Felde

By C. A. Snow & Co.

Attorneys

Dec. 18, 1928.  1,695,371
A. L. FELDE
SCREEN
Filed March 31, 1927   2 Sheets-Sheet 2
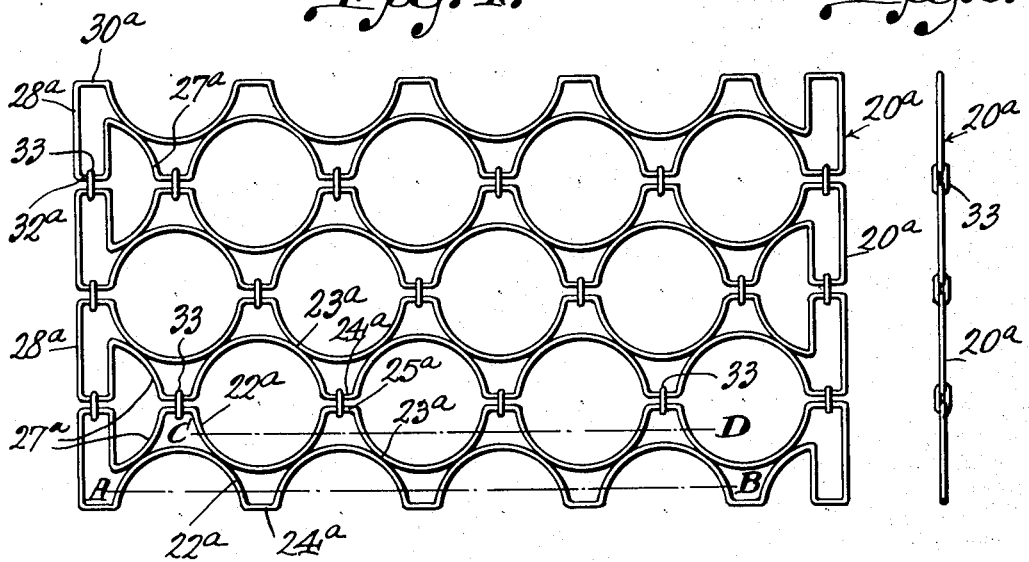
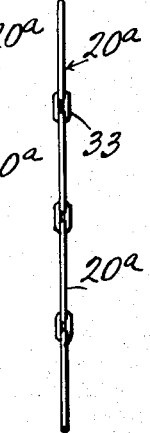
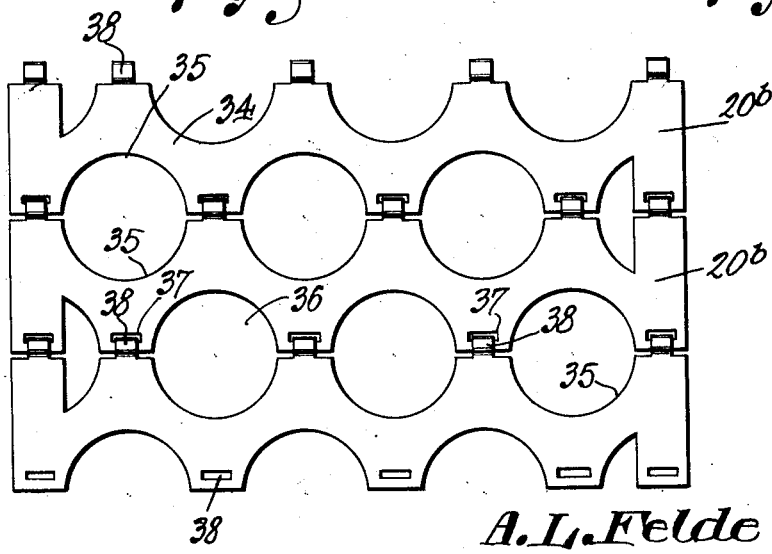
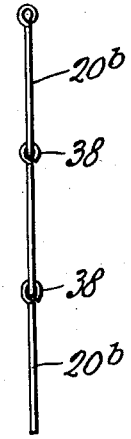

Patented Dec. 18, 1928.

1,695,371

UNITED STATES PATENT OFFICE.

ANDREW L. FELDE, OF BARNESVILLE, MINNESOTA.

SCREEN.

Application filed March 31, 1927. Serial No. 179,936.

This invention aims to provide a novel form of screen for use in a machine that grades potatoes and other vegetables, and the invention aims to provide a novel form of screen in which the openings are of circular contour, the utility of a screen of the class described increasing as its openings approximate circular form.

It is within the province of the disclosure to improve generally and to enhance the utility of devices of that type to which the invention relates.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 4 is a plan showing a modification;

Figure 5 is an edge view of the structure shown in Figure 4;

Figure 6 is a plan showing a further modification;

Figure 7 is an edge view of the structure shown in Figure 6.

Figure 1:
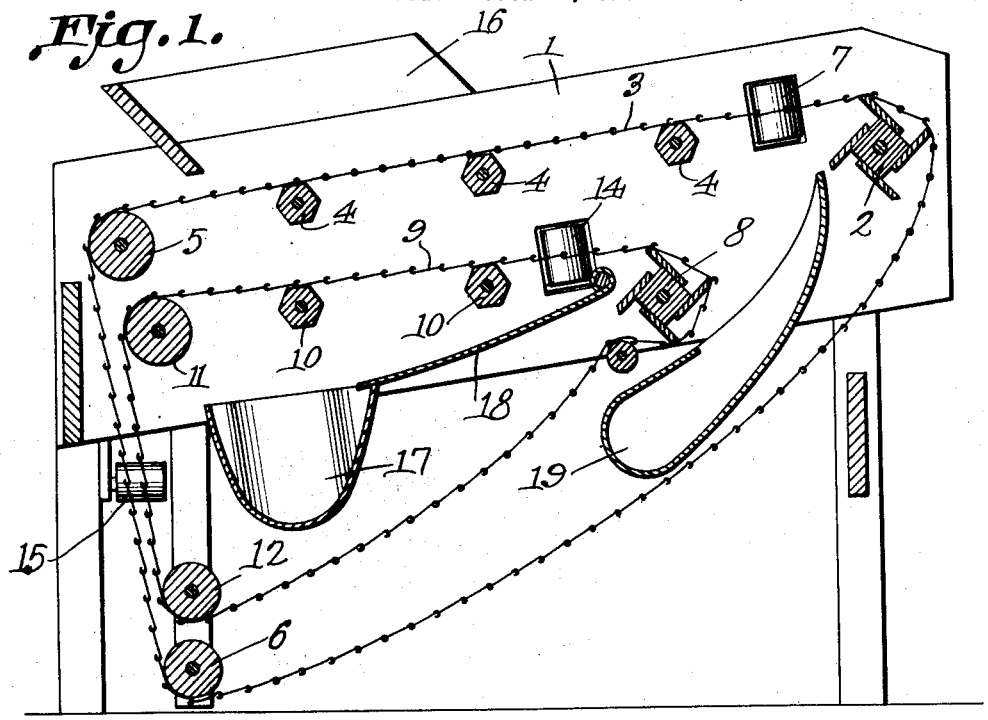
Figure 1 shows in vertical section, and for the sake of illustration, one form of device wherein the flexible screen forming the subject matter of this application may be mounted.

The screen belt hereinafter described may be used with machines of widely different sorts, but by way of illustration there is shown in Figure 1 a double belt potato sorter comprising a frame 1 in which a driving roller 2 is journaled, the roller 2 being engaged with a screen belt 3 that passes around rollers 4, and other rollers 5 and 6, the screen belt 3 being engaged by rotatable edge guides 7. Another driving roller 8 is journaled in the frame 1 and is engaged with a screen belt which is trained across rollers 10 and around other rollers 11 and 12. The screen belt 9 is engaged by rotatable edge guides 14, and a rotatable edge guide 15 cooperates with both of the screen belts 9 and 3. The hopper of the machine is shown at 16, and the chutes at 17 and 19, an apron 18 cooperating with the chute 17. A description of the operation of the machine is not necessary, because such machines are well known to those skilled in the art, and because the device hereinafter claimed may be used with sorting machines of widely different constructions. Let it suffice to say, at this point, that the improvement hereinafter claimed resides in the belts 9 and 3, as to a specific construction whereby the openings in the belts may be made of truly circular form, to attain maximum efficiency, and accuracy in grading.

Figure 2:
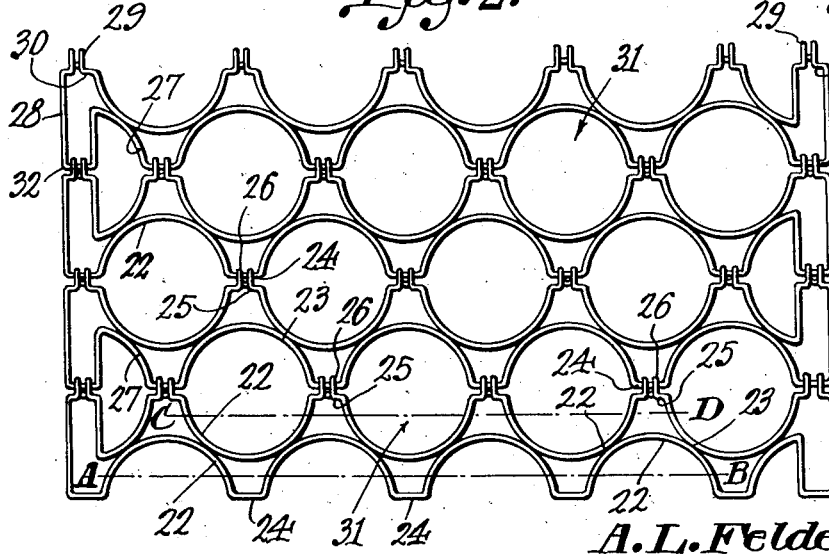
Figure 2 is a plan showing one form of screen.
Figure 3:
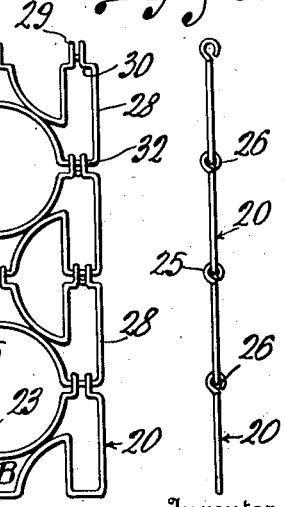
Figure 3 is an edge view of the structure delineated in Figure 2.

In the form shown in Figures 2 and 3, the grading belt is made up of transverse members 20, each including lines A—B and C—D of semicircular parts 22, the semicircular parts 22 in each line of each member being disposed in staggered relation to the semicircular parts of the other line of the same member, the semicircular parts of the lines A—B and C—D having tangential contact, as at 23, and being joined together at their places of tangential contact. Adjoining semicircular parts 22 in the line A—B are united by connections 24, and connections 25 unite adjoining semicircular parts in the line C—D, the connections 25 having hooks 26 that engage the connections 24 of an adjoining transverse member, hingedly, to permit swinging movement between the members of the screen belt, and to form circular grading openings 31, the grading openings being disposed in staggered relation to each other. The means for connecting the semicircular parts of the screen belt and the ends of the lines A—B and C—D comprises quadrantal elements 27, which serve as fillers to complete the lines A—B and C—D, and elongated loops 28 joined to the quadrantal elements 27 and to the terminal semicircular parts 22 by end bars 30 and 32, the end bars 32 being engaged by hooks 29 on the end bars 30 of the loops.

In Figure 4, parts hereinbefore described, have been designated by numerals previously used, with the suffix "a". In this form of the invention, the hooks 26 and 29 in Figure 2 are dispensed with, and their places are taken by links 33.

The sorting belts shown in Figures 2 and 3 comprise transverse members, each of the transverse openings having semicircular parts disposed in staggered relation, the semicircular parts of one member cooperating with the semicircular parts of an adjoining member to form circular grading openings, and means for connecting the said members at points disposed between the semicircular parts, for relative movement. The same description applies to the structure shown in Figures 6 and 7 of the drawings, the grading belt there shown being made of metal plates, instead of wire as in Figures 2 and 4. Referring to Figure 6, the transverse members 34 each have semicircular parts 35 disposed in staggered relation, the semicircular parts of one member cooperating with the semicircular parts of an adjoining member to form circular grading openings 36. The members 34 are provided on one edge with slots 37, and on the opposite edge with hooks 38, the hooks 38 of one member being adapted to be received in the slots 37 of an adjoining member, to form a hinged connection between the members, like that afforded by the links 33 in Figure 4, or by the hooks 26—29 in Figure 2.

What is claimed is: —

1. A sorting belt of the class described, comprising transverse members each made up of two lines of semicircular parts, the semicircular parts in each line of each member being disposed in staggered relation to the semicircular parts of the other line of the same member, the semicircular parts of the lines having tangential contact and being joined together at their places of tangential contact, there being connections that unite the semicircular parts in each line, and means for uniting the connections in one line of each member with the connections of the other line of an adjoining member hingedly, to permit swinging movement between said members and to form circular grading openings which are disposed in staggered relation.

2. A sorting belt of the class described, comprising transverse members each made up of two lines of semicircular parts, the semicircular parts in each line of each member being disposed in staggered relation to the semicircular parts of the other line of same member, the semicircular parts of the lines having tangential contact and being joined together at their places of tangential contact, there being connections that unite adjoining semicircular parts in each line, means for uniting the connections in one line of each member with the connections of the other line of an adjoining member hingedly, to permit swinging movement between said members and to form circular grading openings which are disposed in staggered relation, and means for connecting the semicircular parts of the lines at the ends of the lines, said means embodying quadrantal fillers and elongated loops joined thereto, and means for connecting the ends of the loops of adjoining members hingedly.

In testimony that I claim the foregoing as my own, I have hereto affixed my signature.

ANDREW L. FELDE.